(12) United States Patent  
Yang et al.

(10) Patent No.: US 9,113,708 B2  
(45) Date of Patent: Aug. 25, 2015

(54) SUPPORTING DEVICE

(71) Applicant: SYNCMOLD ENTERPRISE CORP., New Taipei (TW)

(72) Inventors: Yung-Hsiang Yang, New Taipei (TW); Juei-Hsien Wang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 14/283,439

(22) Filed: May 21, 2014

(65) Prior Publication Data

US 2015/0189991 A1    Jul. 9, 2015

(30) Foreign Application Priority Data

Jan. 8, 2014    (TW) .............................. 103200331 U (51) Int. Cl.
*A47B 97/00* (2006.01)
*F16H 1/16* (2006.01)
*F16M 13/02* (2006.01)

(52) U.S. Cl.
CPC *A47B 97/00* (2013.01); *F16H 1/16* (2013.01); *F16M 13/022* (2013.01); *A47B 2097/005* (2013.01)

(58) Field of Classification Search
USPC .......... 248/285.1, 286.1, 287.1, 316.7, 181.1, 248/181.2, 182.1, 183.1, 184.1, 183.2, 248/288.31, 288.51, 918, 292.12, 292.1, 248/291.1, 917, 919, 921, 922
See application file for complete search history.

(56) References Cited

U.S. PATENT DOCUMENTS

| | | | |
|---|---|---|---|
| 7,441,738 B2* | 10/2008 | Kim ......................... | 248/292.12 |
| 8,070,114 B2* | 12/2011 | Chen ............................. | 248/121 |
| 2006/0060735 A1* | 3/2006 | Oddsen et al. ............. | 248/278.1 |
| 2008/0029661 A1* | 2/2008 | Chen ......................... | 248/176.1 |

* cited by examiner

*Primary Examiner* — Steven Marsh
(74) *Attorney, Agent, or Firm* — Steptoe & Johnson LLP (57) ABSTRACT

A supporting device is provided, which includes: a supporting arm having a gas spring and used for a display to be disposed thereon; a base for the supporting arm to be pivotally connected thereto; and an adjusting unit. The adjusting unit includes a worm disposed to the base and rotatable around its own axis; a shaft disposed to the base and separated from the worm; a worm wheel disposed around the shaft; and a connecting board having a fixing end fixed to the worm wheel and a pivot end pivotally connected to the gas spring. The pivot end and the shaft define a central line. Therefore, the worm is rotated to cause the worm wheel to rotate so as to cause the connecting board to pivot around the shaft, thereby adjusting the angle between the central line and the gas spring and hence the tilting angle of the gas spring.

10 Claims, 11 Drawing Sheets

SUPPORTING DEVICE

BACKGROUND OF THE INVENTION

1. Field of the Invention

The present invention relates to supporting devices, and, more particularly, to a display supporting device.

2. Description of Related Art

Figure 1:
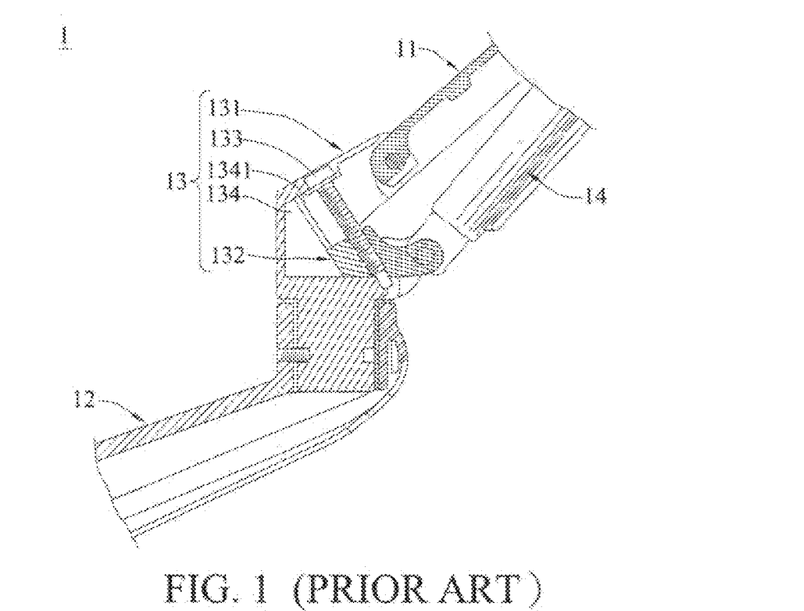
FIGS. 1 and 2 are schematic cross-sectional views of a conventional display supporting arm.
Figure 2:
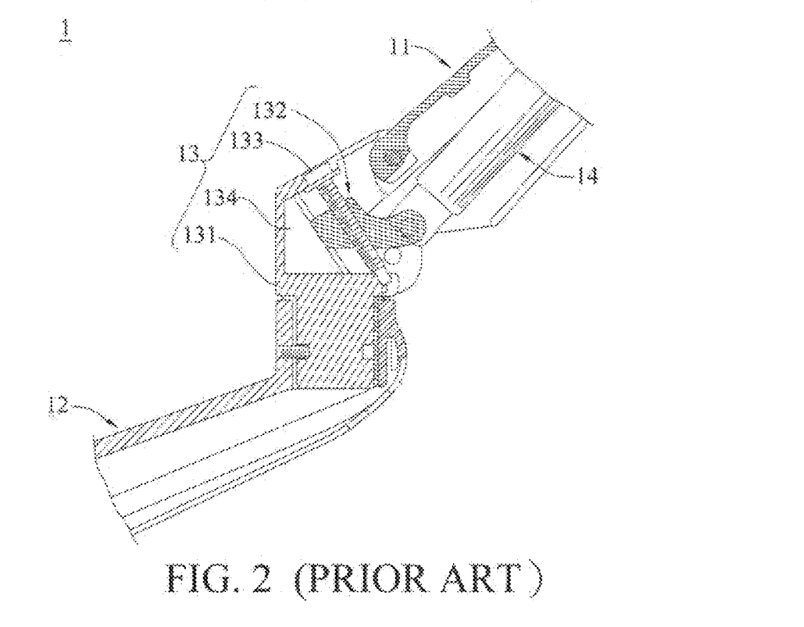

FIGS. 1 and 2 are schematic cross-sectional views of a conventional display supporting arm 1. The display supporting arm 1 has an upper arm 11 and a lower arm 12 pivotally connected to the upper arm 11 through a pivot structure 13.

A gas spring 14 is disposed on the upper arm 11. The pivot structure 13 has a base 131, a pivot member 132 movable relative to the base 131, an adjusting bolt 133 obliquely disposed on the base 131, and two guiding blocks 134 disposed inside the base 131 and each having an oblique surface 1341. One end of the gas spring 14 is pivotally connected to the pivot member 132.

When the adjusting bolt 133 is rotated, the pivot member 132 is caused to move along the adjusting bolt 133 relative to the base 131 so as to change the angle between the gas spring 14 and the pivot member 132, thereby adjusting the vertical component of the supporting force of the gas spring 14 for supporting displays of different sizes and specifications. Further, since the guiding blocks 134 have the oblique surfaces 1341, when the adjusting bolt 133 is rotated, the pivot member 132 can steadily slide along the oblique surfaces 1341 of the guiding blocks 134 relative to the base 131.

Therefore, by causing the pivot member 132 to slide along the oblique surfaces 1341 of the guiding blocks 134 relative to the base 131, the vertical upward supporting force of the gas spring 14 is changed for supporting displays of different weights.

The present invention provides a display supporting device having a different structure for supporting displays of different weights.

SUMMARY OF THE INVENTION

In view of the above-described drawbacks, the present invention provides a supporting device for supporting a display, which comprises: a supporting arm for the display to be disposed thereon, wherein the supporting arm comprises a gas spring; a base for the supporting arm to be pivotally connected thereto; and an adjusting unit. The adjusting unit comprises: a worm spinningly disposed to the base, wherein the worm has a screw thread formed thereon; a shaft disposed to the base and separated from the worm; a worm wheel sleeved on the shaft and having a plurality of teeth engaged with the screw thread of the worm; and a connecting board having a fixing end fixed to the worm wheel and a pivot end pivotally connected to the gas spring, wherein the pivot end of the connecting board and the shaft define a central line. The worm is rotated to cause the worm wheel to rotate so as to cause the connecting board to pivot around the shaft, thereby adjusting the angle between the central line and the gas spring.

In an embodiment, the base comprises at least a fixing component having a receiving groove for receiving the worm of the adjusting unit. The receiving groove of the fixing component can have a central portion and two end portions communicating with two ends of the central portion and being less in sectional diameter than the central portion, and the worm can have a first portion and two second portions connected to two ends of the first portion and being less in diameter than the first portion. The first portion of the worm is received in the central portion of the receiving groove and position-limited by the end portions of the receiving groove. The fixing component can further have an opening communicating with the central portion of the receiving groove, and the worm wheel extends partially into the receiving groove through the opening. The shaft can be disposed on the fixing component.

The screw thread of the worm can be formed on the first portion of the worm. The worm can have an adjusting hole extending axially therein. The worm can be substantially perpendicular to the shaft.

The shaft and the pivot end of the connecting board are spaced at a distance that can be 1.5 to 5 times of the diameter of the worm wheel.

The gas spring can generate a vertical upward component force which increases as the angle between the central line and the gas spring decreases.

According to the present invention, when the worm is rotated, the worm wheel engaged with the worm is caused to rotate so as to cause the connecting board to pivot around the shaft. As such, the angle between the central line and the gas spring is adjusted for supporting displays of different weights.

DETAILED DESCRIPTION OF PREFERRED EMBODIMENTS

The following illustrative embodiments are provided to illustrate the disclosure of the present invention, these and other advantages and effects can be apparent to those in the art after reading this specification.

It should be noted that all the drawings are not intended to limit the present invention. Various modifications and variations can be made without departing from the spirit of the present invention.

Figure 3:
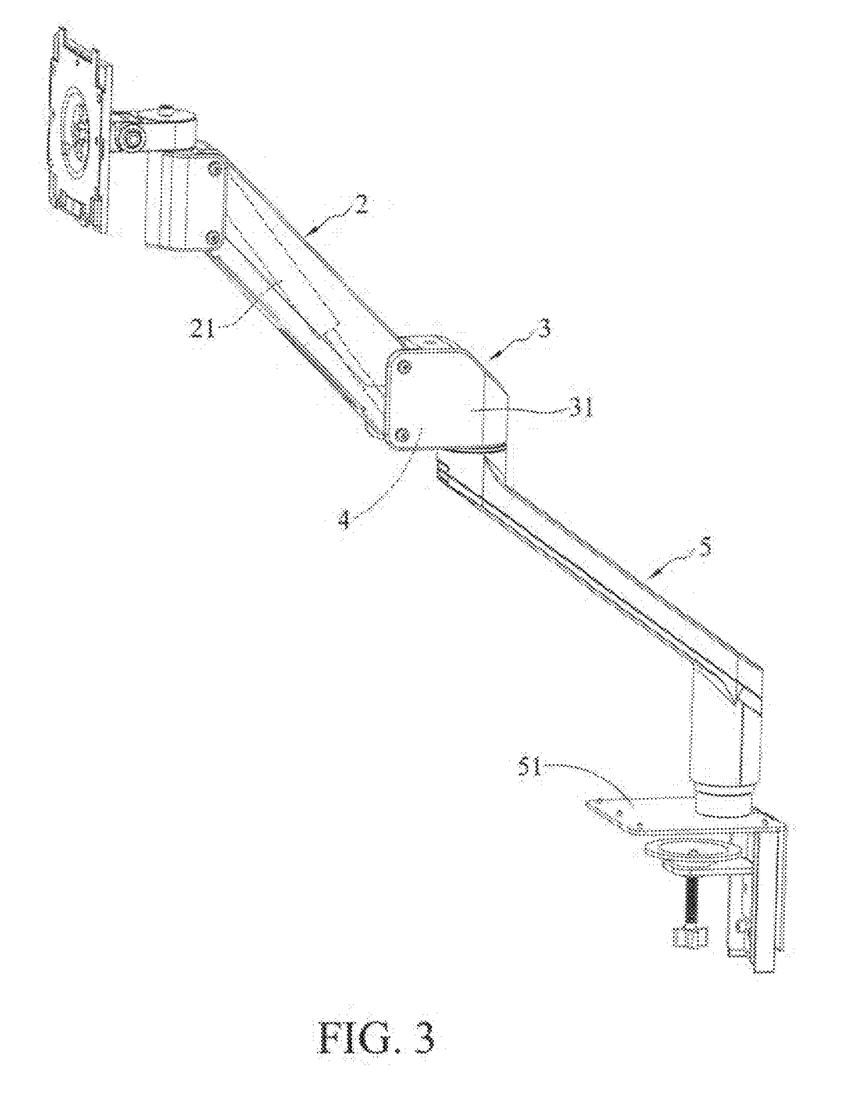
FIGS. 3 and 4 are schematic perspective views of a supporting device according to the present invention.
Figure 4:
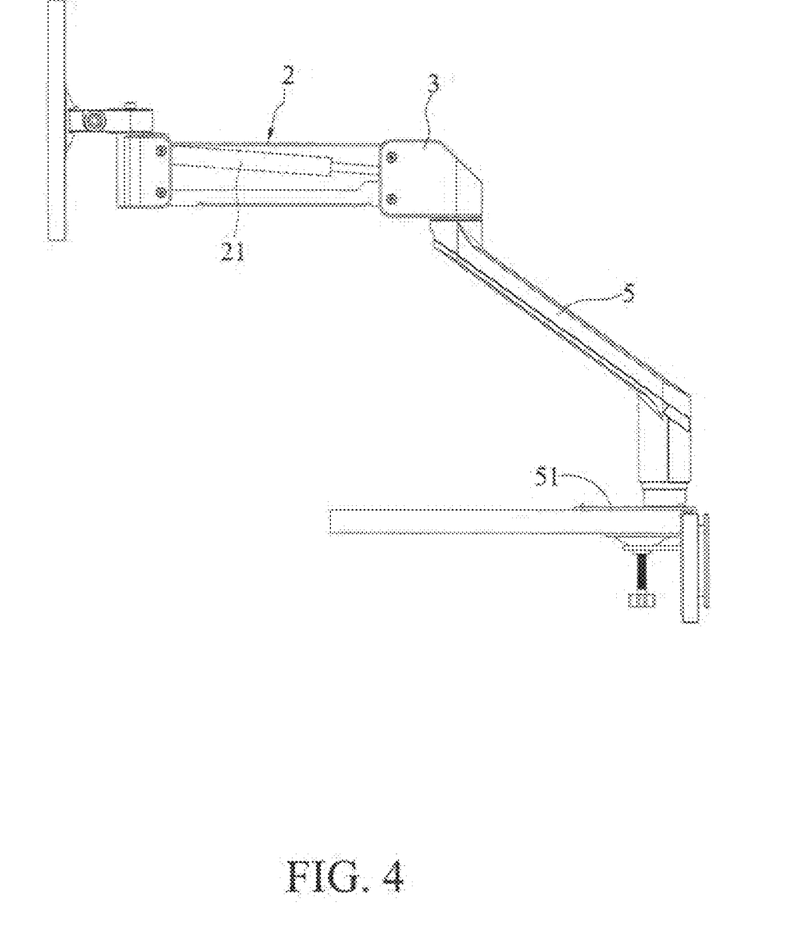

FIGS. 3 and 4 are schematic perspective views of a supporting device of the present invention. Referring to FIG. 3, the supporting device is used to support a display (not shown). The supporting device has a supporting arm 2, a base 3, an adjusting unit 4 and a carrying arm unit 5. One end of the supporting arm 2 is used for the display to be disposed thereon, and the other end of the supporting arm 2 is pivotally connected to the base 3. Further, the supporting arm 2 has a gas spring 21 therein. The adjusting unit 4 is disposed inside the base 3. One end of the carrying arm unit 5 is connected to the base 3, and the other end is fastened to, for example, a table (not shown). In an embodiment, the carrying arm unit 5 has a fastening base 51 which is in the form of a screw clamp and securely fastened to the table in a screwing manner. In another embodiment, the fastening base 51 can be of a wall-mounting type.

FIG. 4 shows an initial state with the supporting arm 2 being at a horizontal position and the gas spring 21 being substantially at a horizontal position. On the other hand, FIG. 3 shows another state (lifted state) when an angle is formed between the supporting arm 2 and the fastening base 51.

The gas spring 21 of the supporting arm 2 can be a pneumatic cylinder, which mainly has two steel tubes fitting one within the other, a control valve seat, a piston, etc., and is filled with nitrogen to provide a pressure of 500 Newton, thereby achieving a telescopic supporting effect.

Figure 5:
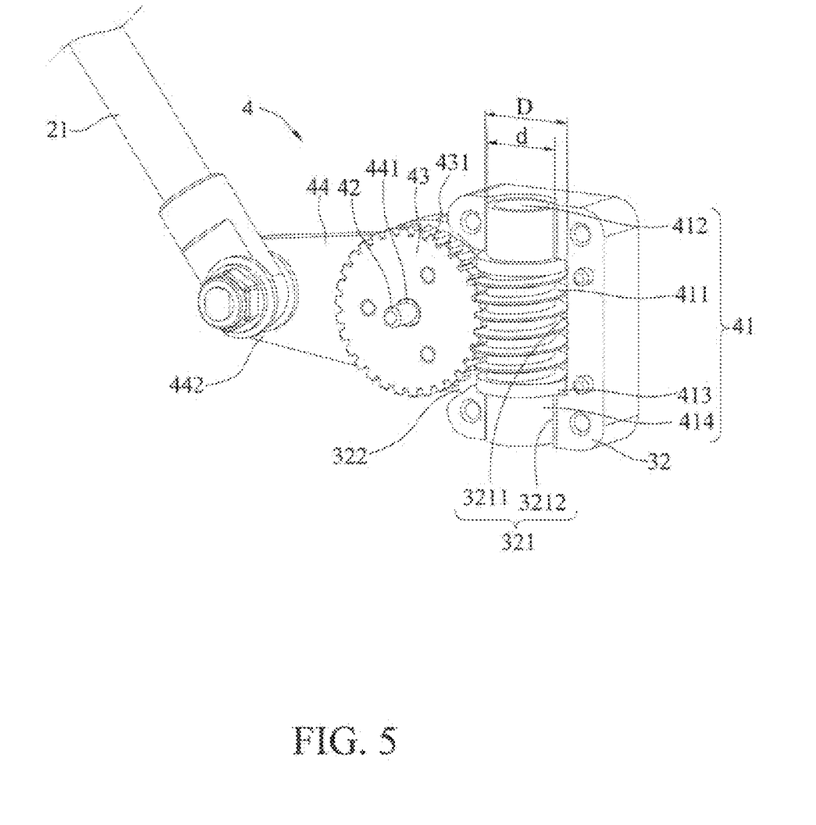
FIG. 5 is a schematic assembly view of the supporting device according to the present invention.
Figure 6:
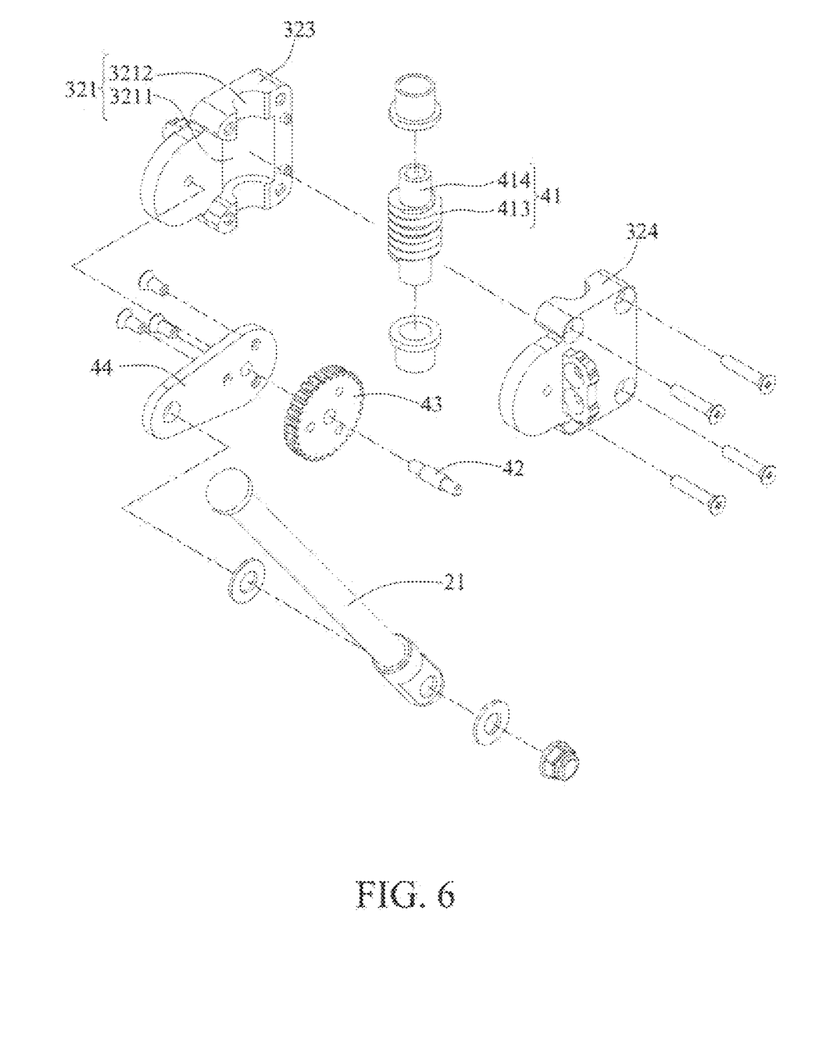
FIG. 6 is a schematic exploded view of the supporting device according to the present invention.

FIG. 5 is a schematic assembly view of the supporting device. FIG. 6 is a schematic exploded view of the supporting device. Referring to FIGS. 5, 6 and 3, the base 3 has a housing 31 and a fixing component 32 disposed inside the housing 31. The fixing component 32 has a first case 323 and a second case 324 that cooperatively define a receiving groove 321 and an opening 322. The first case 323 and the second case 324 are locked together through a plurality of screws. The receiving groove 321 has a central portion 3211 and two end portions 3212 communicating with two ends of the central portion 3211. Each of the end portions 3212 has a sectional diameter d which is less than a sectional diameter D of the central portion 3211. The opening 322 communicates with the central portion 3211 of the receiving groove 321.

The adjusting unit 4 has a worm 41, a shaft 42, a worm wheel 43 and a connecting board 44. The worm 41 is spinningly disposed to the base 3. Further, the worm 41 has a screw thread 411 formed thereon and an adjusting hole 412 extending axially therein. If necessary, an adjusting tool (not shown) can be inserted into the adjusting hole 412 to rotate the worm 41 horizontally. The shaft 42 is disposed on the fixing component 32.

In an embodiment, the worm 41 of the adjusting unit 4 is received in the receiving groove 321. The worm 41 has a first portion 413 and two second portions 414 connected to two ends of the first portion 413 and being less in diameter than the first portion 413. The screw thread 411 is formed on the first portion 413 of the worm 41. The first portion 413 of the worm 41 is received in the central portion 3211 of the receiving groove 321 and position-limited by the end portions 3212 of the receiving groove 321. Since the sectional diameter of the first portion 413 of the worm 41 is greater than the sectional diameter d of the end portions 3212, the worm 41, when rotating on its own axis, does not fall out of the receiving groove 321. Further, the screw thread 411 of the worm 41 is positioned on the central portion 3211 of the fixing component 32 and adjacent to the opening 322.

The shaft 42 is disposed to the base 3 and separated from the worm 41 by a distance. The worm 41 is substantially perpendicular to the shaft 42, but not limited thereto. The worm wheel 43 has a plurality of teeth 431. The worm wheel 43 is sleeved on the shaft 42 and extends partially into the receiving groove 321 through the opening 322 of the fixing component 32 so as for the teeth 431 to engage with the screw thread 411 of the worm 41. The connecting board 44 has a fixing end 441 fixed to the worm wheel 43 and a pivot end 442 pivotally connected to the gas spring 21. The pivot end 442 of the connecting board 44 and the shaft 42 define a central line L, as shown FIGS. 7 to 12. The distance between the shaft 42 and the pivot end 442 is 1.5 to 5 times of the diameter of the worm wheel 43.

FIGS. 7 to 12 show changes of the angle between the central line L and the table. When a tool is inserted into the adjusting hole 412 of the worm 41 to rotate the worm 41, since the first portion 413 of the worm 41 is position-limited in the receiving groove 321 (no screw thread is formed on an inner surface of the receiving groove 321), the worm 41 only rotates on its own axis in the receiving groove 321, without moving upward or downward relative to the fixing component 32. Further, when the worm 41 is rotated and thus turns the worm wheel 43, the connecting board 44 is driven to pivot on the shaft 42, thereby the angle between the central line L and the gas spring 21 is adjusted.

Figure 7:
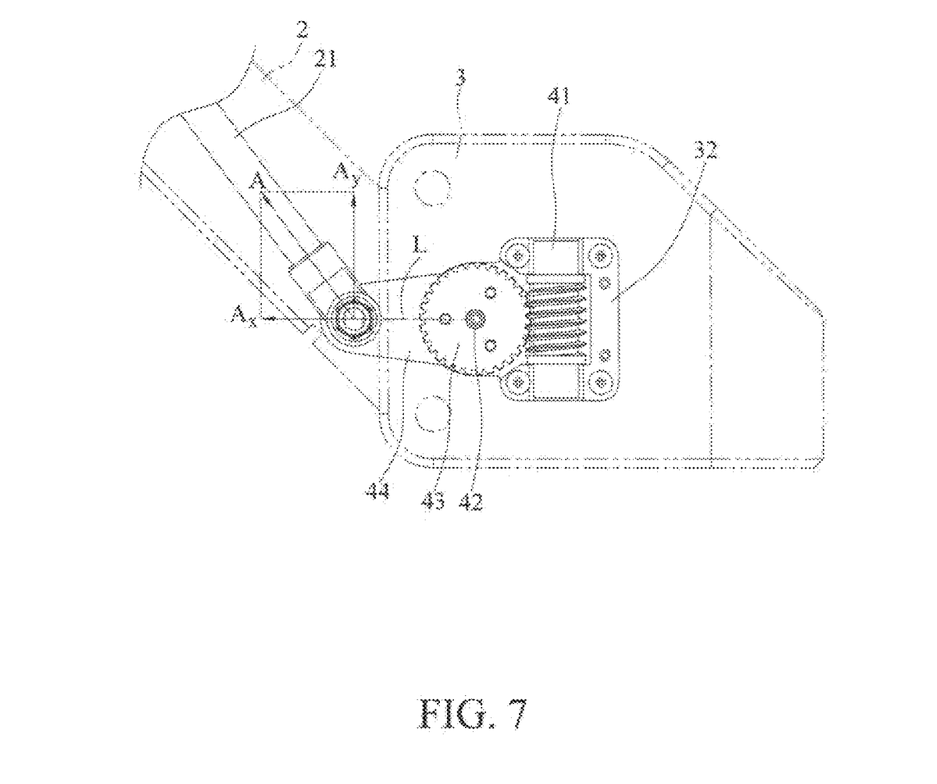
FIG. 7 is a schematic view showing a state in which the angle between the central line of the supporting device and a table is zero degree.
Figure 8:
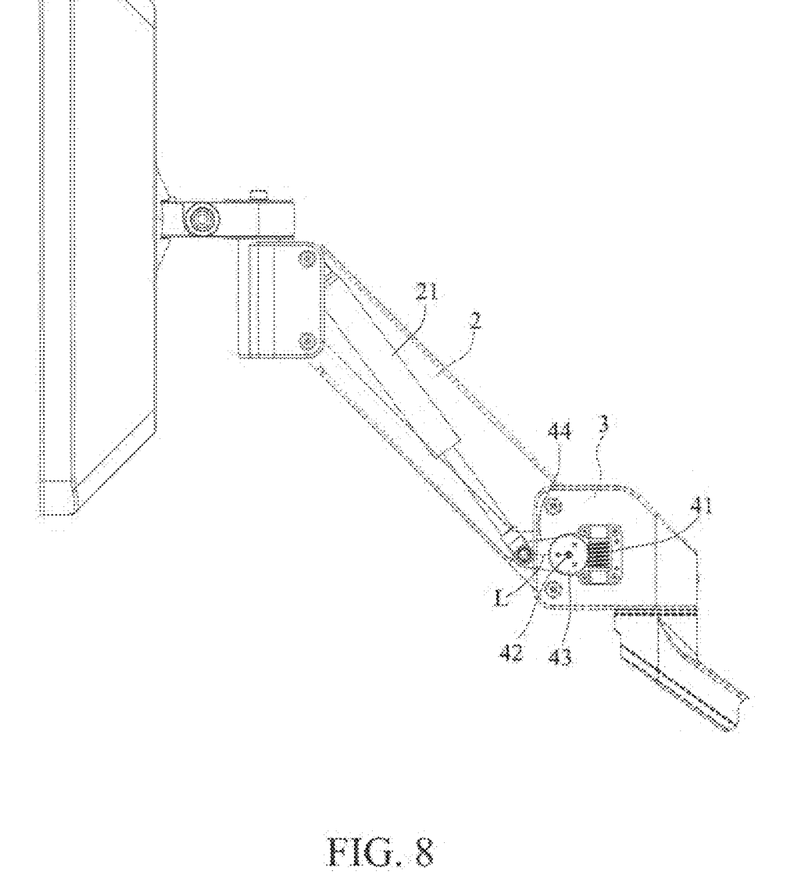
FIG. 8 is a schematic view showing practical implementation of the supporting device with the angle between the central line and the table being zero degree.

Referring to FIGS. 7 and 8, the angle between the central line L and the table is zero degree, and the angle between the central line L and the gas spring 21 is about 126 degrees. The gas spring 21 provides a vertical upward component force to support the display. In particular, the gas spring 21 provides a supporting force A. In an XY coordinate system, the supporting force A is divided into a horizontal component force $A_x$ in X direction and a vertical upward component force $A_y$ in Y direction, as shown in FIG. 7.

Figure 9:
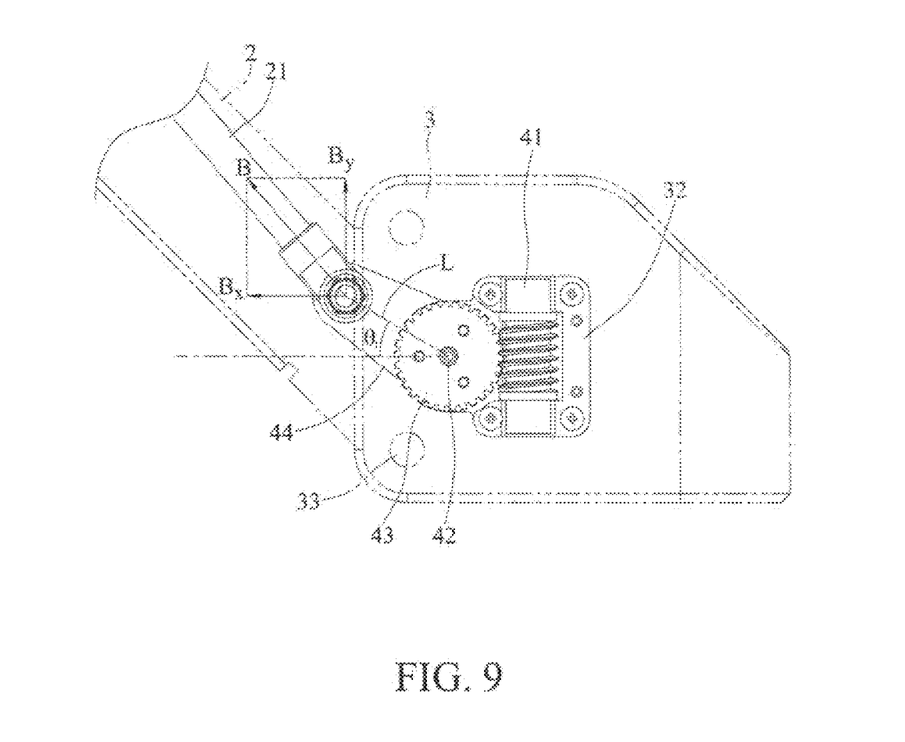
FIG. 9 is a schematic view showing a state in which the angle $\theta_1$ between the central line of the supporting device and the table is positive 30 degrees.
Figure 10:
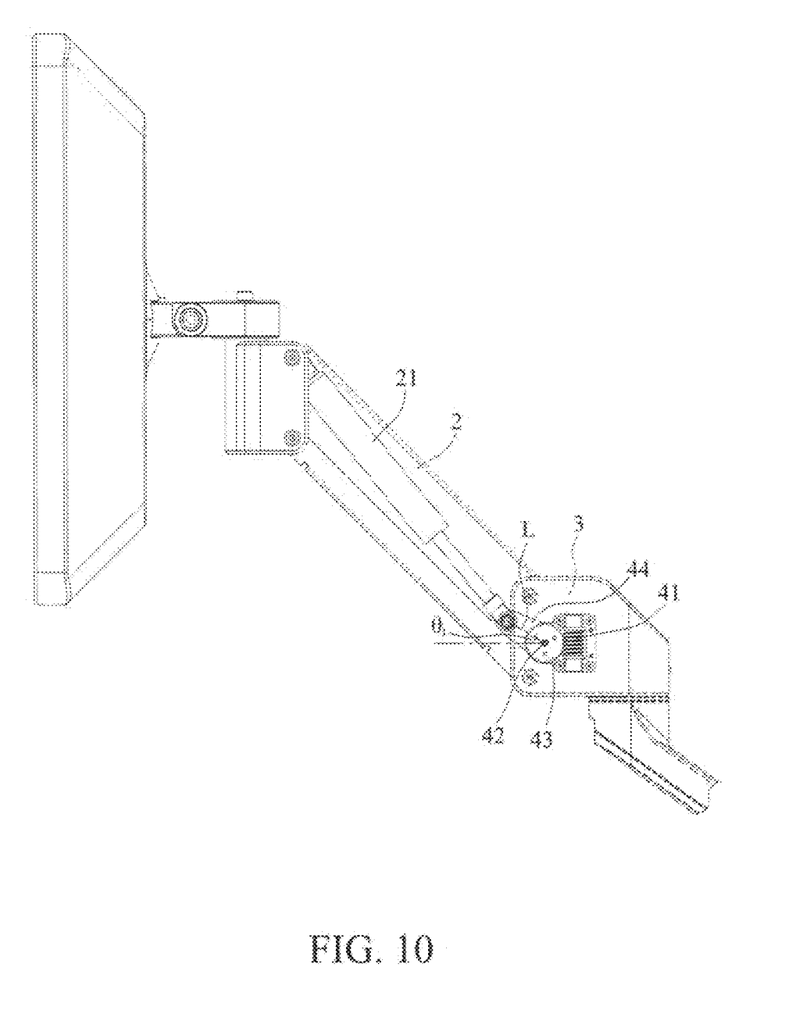
FIG. 10 is a schematic view showing practical implementation of the supporting device with the angle $\theta_1$ between the central line and the table being positive 30 degrees.

Referring to FIGS. 9 and 10, the angle $\theta_1$ between the central line L and the table is positive 30 degrees, and the angle between the central line L and the gas spring 21 is about 160 degree. As such, the gas spring 21 provides a vertical upward component force less than the vertical upward component force in FIGS. 7 and 8. In particular, the gas spring 21 provides a supporting force B, and in an XY coordinate system the supporting force B is divided into a horizontal component force $B_x$ in X direction and a vertical upward component force $B_y$ in Y direction, as shown in FIG. 9. Obviously, the vertical upward component force $B_y$ is less than the vertical upward component force $A_y$. That is to say, the supporting device is adjusted for supporting a lighter display in this way.

Figure 11:
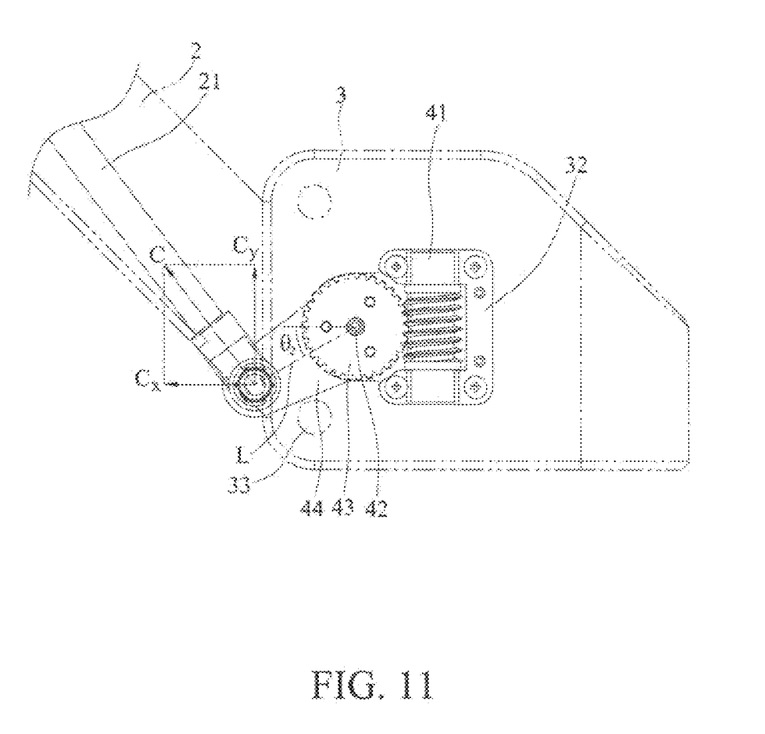
FIG. 11 is a schematic view showing a state in which the angle $\theta_2$ between the central line of the supporting device and the table is negative 30 degrees.
Figure 12:
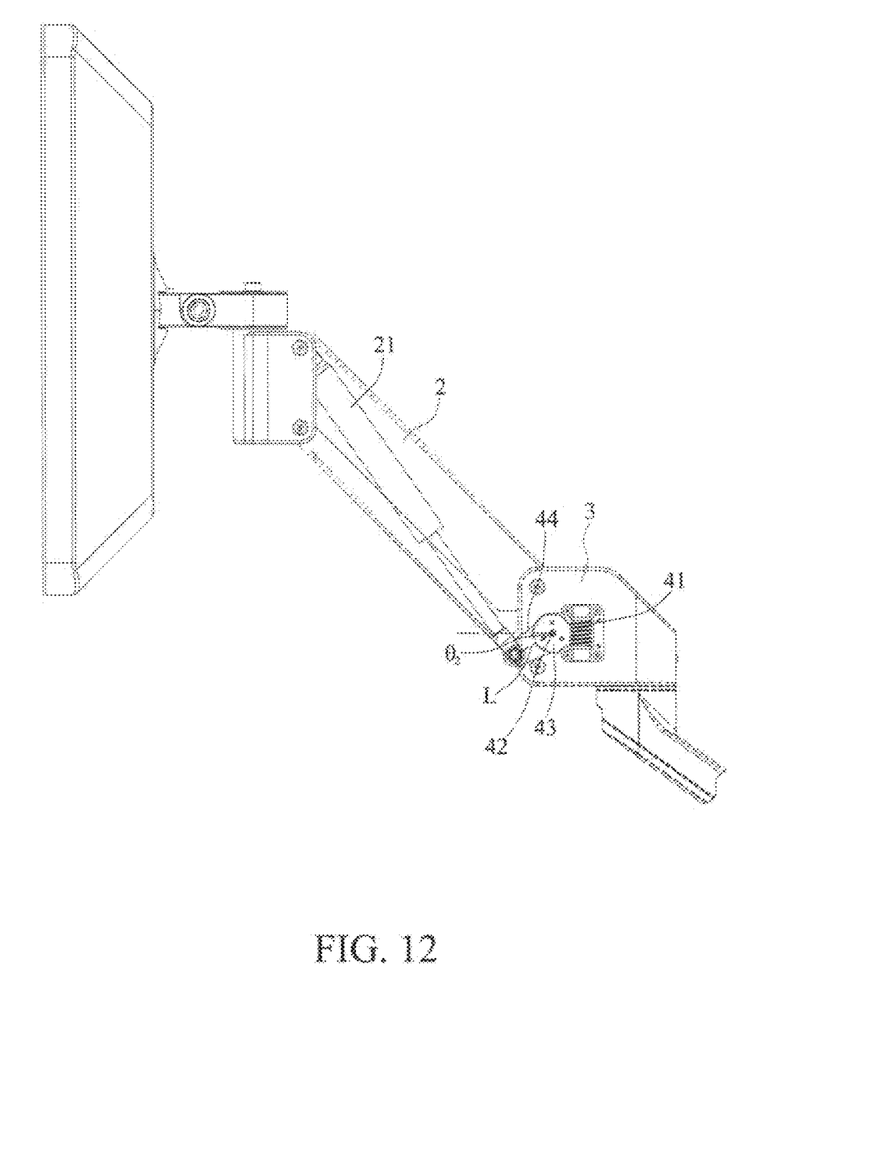
FIG. 12 is a schematic view showing practical implementation of the supporting device with the angle $\theta_2$ between the central line and the table being negative 30 degrees.

Referring to FIGS. 11 and 12, the angle $\theta_1$ between the central line L and the table is negative 30 degrees, and the angle between the central line L and the gas spring 21 is about 95 degrees. As such, the gas spring 21 provides a vertical upward component force greater than the vertical upward component force in FIGS. 7 and 8. In particular, the gas spring 21 provides a supporting force C, and in an XY coordinate system the supporting force C is divided into a horizontal component force $C_x$ in X direction and a vertical upward component force $C_y$ in Y direction, as shown in FIG. 11. Since the vertical upward component force $C_y$ is greater than the vertical upward component force $A_y$, a heavier display can be supported.

To sum up, the less the angle between the central line L and the gas spring 21 is, the greater the vertical upward component force generated becomes. In other words, the vertical upward component force ($A_y$, $B_y$ or $C_y$) generated by the gas spring 21 increases as the angle between the central line L and the gas spring 21 decreases.

It should be noted that since the worm 41 rotates horizontally and the worm wheel 43 rotates vertically, if no enough external force is provided, a self-locking effect is generated between the worm 41 and the worm wheel 43 so as to fix the angle between the gas spring 21 and the central line L after being adjusted.

According to the present invention, when the worm is rotated, the worm wheel engaged with the worm is caused to rotate so as to cause the connecting board to pivot around the shaft, thereby adjusting the angle between the central line and the gas spring and hence the tilting angle of the gas spring. As such, the vertical upward component force generated by the gas spring is changed for supporting displays of different weights.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A supporting device for supporting a display, comprising:
    a supporting arm for the display to be disposed thereon, wherein the supporting arm comprises a gas spring;
    a base for the supporting arm to be pivotally connected thereto; and
    an adjusting unit, comprising:
        a worm spinningly disposed to the base, wherein the worm has a screw thread formed thereon;
        a shaft disposed to the base and separated from the worm;
        a worm wheel sleeved on the shaft and having a plurality of teeth engaged with the screw thread of the worm; and
        a connecting board having a fixing end fixed to the worm wheel and a pivot end pivotally connected to the gas spring, wherein the pivot end of the connecting board and the shaft define a central line;
    wherein when the worm is rotated and thus turns the worm wheel, the connecting board is driven to pivot on the shaft, thereby an angle between the central line and the gas spring is adjusted.

2. The supporting device of claim 1, wherein the base comprises at least a fixing component having a receiving groove for receiving the worm of the adjusting unit.

3. The supporting device of claim 2, wherein the receiving groove of the fixing component has a central portion and two end portions communicating with two ends of the central portion and being less in sectional diameter than the central portion, and the worm has a first portion and two second portions connected to two ends of the first portion and being less in diameter than the first portion, wherein the first portion of the worm is received in the central portion of the receiving groove and position-limited by the end portions of the receiving groove.

4. The supporting device of claim 3, wherein the fixing component further has an opening communicating with the central portion of the receiving groove, and the worm wheel extends partially into the receiving groove through the opening.

5. The supporting device of claim 3, wherein the screw thread of the worm is formed on the first portion of the worm.

6. The supporting device of claim 2, wherein the shaft is disposed on the fixing component.

7. The supporting device of claim 1, wherein the worm has an adjusting hole extending axially therein.

8. The supporting device of claim 1, wherein the worm is substantially perpendicular to the shaft.

9. The supporting device of claim 1, wherein the shaft and the pivot end of the connecting board are spaced at a distance that is 1.5 to 5 times of a diameter of the worm wheel.

10. The supporting device of claim 1, wherein the gas spring generates a vertical upward component force which increases as the angle between the central line and the gas spring decreases.

* * * * *